(12) United States Patent
McEntee et al.

(10) Patent No.: US 8,640,104 B2
(45) Date of Patent: Jan. 28, 2014

(54) COMPUTER METHOD AND APPARATUS FOR DEBUGGING IN A DYNAMIC COMPUTER LANGUAGE

(75) Inventors: Mark D. McEntee, Chesapeake, VA (US); Merle D. Sterling, Austin, TX (US); Keith A. Wells, Angier, NC (US)

(73) Assignee: International Business Machines Corporation, Armonk, NY (US)

( * ) Notice: Subject to any disclaimer, the term of this patent is extended or adjusted under 35 U.S.C. 154(b) by 890 days.

(21) Appl. No.: 12/633,388

(22) Filed: Dec. 8, 2009

(65) Prior Publication Data

US 2011/0138361 A1 Jun. 9, 2011

(51) Int. Cl.
*G06F 9/44* (2006.01)
(52) U.S. Cl.
USPC .......................................................... 717/125

(58) Field of Classification Search
USPC ........................................... 710/125; 717/125
See application file for complete search history.

(56) References Cited

U.S. PATENT DOCUMENTS

2009/0083718 A1* 3/2009 Lobo et al. .................... 717/139

* cited by examiner

*Primary Examiner* — Chun-Kuan Lee
(74) *Attorney, Agent, or Firm* — Hamilton, Brook, Smith & Reynolds, P.C.

(57) ABSTRACT

A computer based method and apparatus generate a class relationship diagram of dynamic language objects. In response to a user selecting a subject object implemented in the dynamic language, a diagramming member forms and displays a class relationship diagram of the subject object The class relationship diagram visually illustrates relationships between the subject object and objects it inherits from and objects it contains as extracted from the inheritance chain of the subject object. UML or graph notation may be employed in the generated class relationship diagram.

18 Claims, 7 Drawing Sheets

COMPUTER METHOD AND APPARATUS FOR DEBUGGING IN A DYNAMIC COMPUTER LANGUAGE

BACKGROUND

The use of JavaScript (trademark of Sun MicroSystems) and AJAX (Asynchronous JavaScript and XML) techniques to build rich internet (global computer network) applications is rapidly growing in popularity but is also growing in complexity. Briefly, JavaScript is an object-oriented scripting language used to enable programmatic access to objects within applications (both server-side applications and client side applications such as Web Browsers and others). A common use of JavaScript is in the form of client-side JavaScript, implemented as an integrated component of the web browser, allowing the development of enhanced user interfaces and dynamic websites. JavaScript is a dialect of the ECMAScript standard and is characterized in the art as a dynamic, weakly typed, prototype-based language with first-class functions.

Generally, client-side JavaScript is used to write functions that (i) are embedded in or included from an HTML page/web page served from a Web Server to a Web Browser, and (ii) interact with the Document Object Model (DOM) of the page. Some simple examples of this usage are:

opening or popping up a new window with programmatic control over the size, position, and other attributes of the new window (i.e. whether the menus, toolbars, etc. are visible);

validating web form input values to make sure that the values will be accepted before they are submitted to the server; and changing images, such as important links displayed as graphical elements, as the cursor moves over them.

Because JavaScript code can run locally in a client's/user's browser (rather than on a remote server), it can respond to user actions quickly. This in turn produces the effect of making an application feel more responsive. Furthermore, JavaScript code can detect user actions which HTML alone cannot, such as individual keystrokes. Various internet/global computer network applications take advantage of this by having much of the user-interface logic written in JavaScript, and by having JavaScript dispatch requests for information to the server. The wider trend of Ajax programming similarly exploits this strength.

So called "Ajax programming" or AJAX is a group of web development techniques used on the client-side to create interactive web applications. AJAX enables web applications to retrieve data from the server asynchronously in the background without interfering with the display and behavior of the existing Web page. The use of AJAX techniques has led to an increase in interactive or dynamic interfaces on web pages and in some cases better quality of Web services due to the asynchronous mode. Data is usually retrieved using the XMLHttpRequest object. Despite the name, the use of JavaScript and XML together is not actually required, nor do the requests need to be asynchronous.

Initially, the target audience of Java Script was web authors and other such "amateur" programmers. With the advent of AJAX, JavaScript has become one of the most popular programming languages on the web even among professional programmers. The result has been a proliferation of comprehensive frameworks and libraries, improved JavaScript programming practices, and increased usage of JavaScript outside of the browser, as seen by the proliferation of server-side JavaScript platforms. In turn, there is an increasing demand for Java Script debugging and debugger features.

Most web browsers provide some form of JavaScript console and/or 'DOM inspector' to view the DOM (Document Object Model) elements on a web page, CSS (Cascade Style Sheets) rules, and JavaScript objects as well as some form of debugger to aid in stepping through JavaScript code. Due to the mostly anonymous nature of JavaScript objects, it is often difficult to visualize the relationships between objects at runtime.

For example, given a single level of inheritance:
function Node(name) {this.name=name;}
ProxyNode.prototype.superclass=Node;
function ProxyNode(name, type) {this.superclass(name); this.type=type;}
function processNode(node) {//do something with 'node'}

Assuming one creates either a Node or ProxyNode and passes it to the processNode function, the best the JS debugger can do is show that the type of the 'node' parameter is Object. It will show the member variables as well but one can only tell that the actual type of the object was Node or ProxyNode by looking at the code and seeing that the object one is examining in the debugger has a 'type' member so therefore must be a ProxyNode. It is not obvious that ProxyNode inherits from Node in this and other examples.

BRIEF SUMMARY

The present invention addresses the shortcomings of the prior art. The core idea of the present invention is to augment the functionality of a JavaScript debugger to allow one to select a given JavaScript object and generate a class relationship diagram (for example, using graph or UML Unified Modeling Language notation). The generated class relationship diagram shows visually the relationships between that object and objects it contains or inherits from.

According to one embodiment of the present invention, a computer method, apparatus or system comprises a diagram member diagramming class relationships of a subject object in a dynamic programming/scripting language (e.g., Java Script or other dynamic computer language). The diagramming member forms or draws a diagram illustrating class relationships of the subject object. And a display unit outputs or otherwise renders the formed diagram to a user, for example in response to user request or command in a debugger.

In one embodiment, the diagramming member forms or draws the diagram by:

traversing an inheritance chain (Prototype chain in JavaScript) of the subject object, for each level in the inheritance chain, reading methods (and properties) of inherited objects, and adding the read methods (and properties) to the subject object as dynamically generated.

In embodiments, the formed diagram visually shows, illustrates or otherwise represents, relationships between the subject object and objects it contains. The formed diagram may also visually show/illustrate relationships between the subject object and objects it inherits from (e.g., parent objects).

BRIEF DESCRIPTION OF THE SEVERAL VIEWS OF THE DRAWINGS

The foregoing will be apparent from the following more particular description of example embodiments of the invention, as illustrated in the accompanying drawings in which like reference characters refer to the same parts throughout the different views. The drawings are not necessarily to scale.

DETAILED DESCRIPTION

Figure 1:
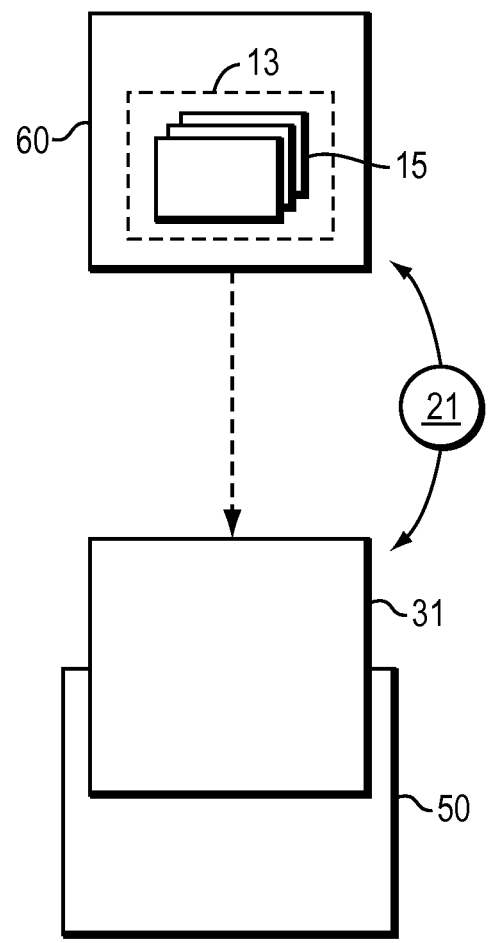
FIG. 1 is a schematic view of a dynamic programming/scripting language debugger embodying the present invention.

Embodiments of the present invention generate diagrams of class relationships of objects in dynamic computer languages (like JavaScript) where the class relationships can change at any instant during runtime. The use of JavaScript in the following description is for purposes of illustration and clarity in description and not limitation.

Typically, a dynamic computer language (e.g., programming or scripting language) may have the features of: dynamic typing, being object based, and run-time evaluation. With regard to dynamic typing as in most scripting languages, types are associated with the values, not variables. For example, a variable x could be bound to a number, then later rebound to a string. JavaScript supports various ways to test the type of an object.

With regard to being object based, JavaScript is almost entirely object-based. JavaScript objects are associative arrays, augmented with prototypes (see below). Object property names are string keys: ojb.x=10 and obj["x"]=10 are equivalent, the dot notation being a syntactic alternative. Properties and their values can be added, changed, or deleted at run-time. Most properties of an object (and those on its prototype inheritance chain) can be enumerated using a for . . . in loop. JavaScript has a small number of built-in objects such as Function and Date.

With regard to run-time evaluation, JavaScript includes an eval function that can execute statements provided as strings at run-time.

Further, as mentioned above, JavaScript functions are first-class; they are objects themselves. As such, these functions have properties and can be passed around and interacted with like any other object. Inner functions (functions defined within other functions) are created each time the outer function is invoked and variables of the outer functions for that invocation continue to exist as long as the inner functions still exist, even after that invocation is finished (e.g. if the inner function was returned, it still has access to the outer function's variables). This is the mechanism behind closures within JavaScript.

With respect to being prototype-based, JavaScript uses prototypes instead of classes for inheritance. It is possible to simulate many class-based features with prototypes in JavaScript. In addition, functions double as object constructors along with their typical role. Prefixing a function call with new creates a new object and calls that function with its local this keyword bound to that object for that invocation. The constructor's prototype property determines the object used for the new object's internal prototype. JavaScript's built-in constructors, such as Array, also have prototypes that can be modified.

Unlike many object-oriented languages, there is no distinction between a function definition and a method definition. Rather, the distinction occurs during function calling; a function can be called as a method. When a function is called as a method of an object, the function's local this keyword is bound to that object for that invocation. Further, an indefinite number of parameters can be passed to a function. The function can access them through formal parameters and also through the local arguments object.

JavaScript typically relies on a run-time environment (e.g. in a web browser) to provide objects and methods by which scripts can interact with "the outside world" (i.e. outside of the browser). In fact, JavaScript relies on the environment to provide the ability to include/import scripts (e.g. HTML <script> elements). For example, a JavaScript Web server exposes host objects representing an HTTP request and response objects. A JavaScript program (in the Web browser, for example) can then manipulate these objects to dynamically generate one or more web pages.

A JavaScript debugger is a computer program used to test and debug target programs written in JavaScript. A JavaScript debugger and more generally debugger 21 embodying the present invention is illustrated in FIG. 1.

Illustrated in FIG. 1 is a web site 13 hosted by at least one web server 60 and generally having one or more web pages 15. Typically, the contents of a web page 15 are written in a mark-up language (e.g., HTML), and the presentation semantics (i.e., web page layout, color, fonts and other display formatting) are written in style sheet language. Commonly, Cascading Style Sheets (CSS) is used to style web pages written in HTML and XHTML.

A web server 60 delivers (serves) web pages 15 (HTML documents) and associated content (e.g., images, style sheets, Java Scripts) to client 50 in response to client user activity through a web browser 31. That is, based on client 50 user command/operation, the web browser 31 makes a request for a pertinent resource and the web server 60 responds with the contents (HTML document, images, style sheet, Java Scripts) of that resource.

The client 50/web browser 31 and web server 60 communicate requests and contents using the Hypertext Transfer Protocol (HTTP) or similar protocol. While a primary function of the web server 60 is to serve content, HTTP also allows the web server 60 to receive content from clients 50. One example of this feature is when a client 50/user submits web forms and uploads files. Both the client 50 and the web server 60 use HTTP in this communication.

When the client 50/browser 31 requested content is so called "static", the web server 60 returns a fixed HTML document (among the other associated contents). Upon receipt of the fixed HTML document by the requesting browser 31, the Web browser 31 transforms the subject document 15 from mark-up (HTML) to an interactive document and displays the resulting document according to the associated style sheet, DOM (Document Object Model) and mark-up language instructions. Web browser 31 typically creates host objects for reflecting the DOM into Java Script. Included in the web browser 31 transforming the HTML, the web browser 31 interprets any JavaScript source code embedded in the HTML document 15.

When the browser 31 requested content is "dynamic", the web server 60 executes a script to create the subject HTML document 15 on the fly. This is referred to as server-side scripting. Many web servers 60 support server-side scripting.

Since Java Script is interpreted, loosely typed, and may be hosted in various environments, a programmer has to take extra care to make sure the Java Script code executes as expected in as wide of a range of circumstances as possible. Thus a debugger 21 is provided.

Generally speaking debugger 21 is a software tool which enables the programmer to monitor the execution of a program, such as web browser 31 and/or web server 60 dynamic document generation. Using known/common technology, debugger 21 enables the programmer to stop the subject program, restart it, set break points, change values in memory and go back in time.

After the test case is sufficiently simplified, a programmer can use debugger 21 to examine program states (values of variables, the call stack, etc.) and track down origin of a problem. Alternatively, "tracing" can be used. In a simple case, tracing is a few print statements that output the values of variables at certain points of program execution.

Example scripting language or dynamic computer language debuggers include MicroSoft Visual Studio and Firebug Debugger. Debugger 21 uses the common techniques used in these debuggers for the basic operations of logging and evaluating Java Script and logging CSS errors and warnings.

In addition, the present invention debugger 21 generates class relationship diagrams of dynamic language (e.g., Java Script) objects as follows:

1. Given a web page 15 formed of JavaScript (or other dynamic computer language), the user/programmer selects an element on the web page backed by a JavaScript object to inspect. This selection is accomplished through the user interface or console of debugger 21 similar to that of the above mentioned JavaScript Debuggers.

2. The debugger 21 walks the Prototype chain (traverses the inheritance chain generally) of the selected/corresponding object and generates and displays a graph or UML diagram. The graph or diagram is preferably generated using the process or diagramming member 33 of FIG. 2 detailed later.

3. The diagram shows (illustrates or otherwise represents) the methods and properties of related classes of the subject object including:
   a. The class being inspected.
   b. Any classes that are referenced in the first class's member variables.
   c. Any class from which the first class inherits.
   d. The relationship between classes referenced by the member variables and other classes, recursively to some depth.

Figure 2:
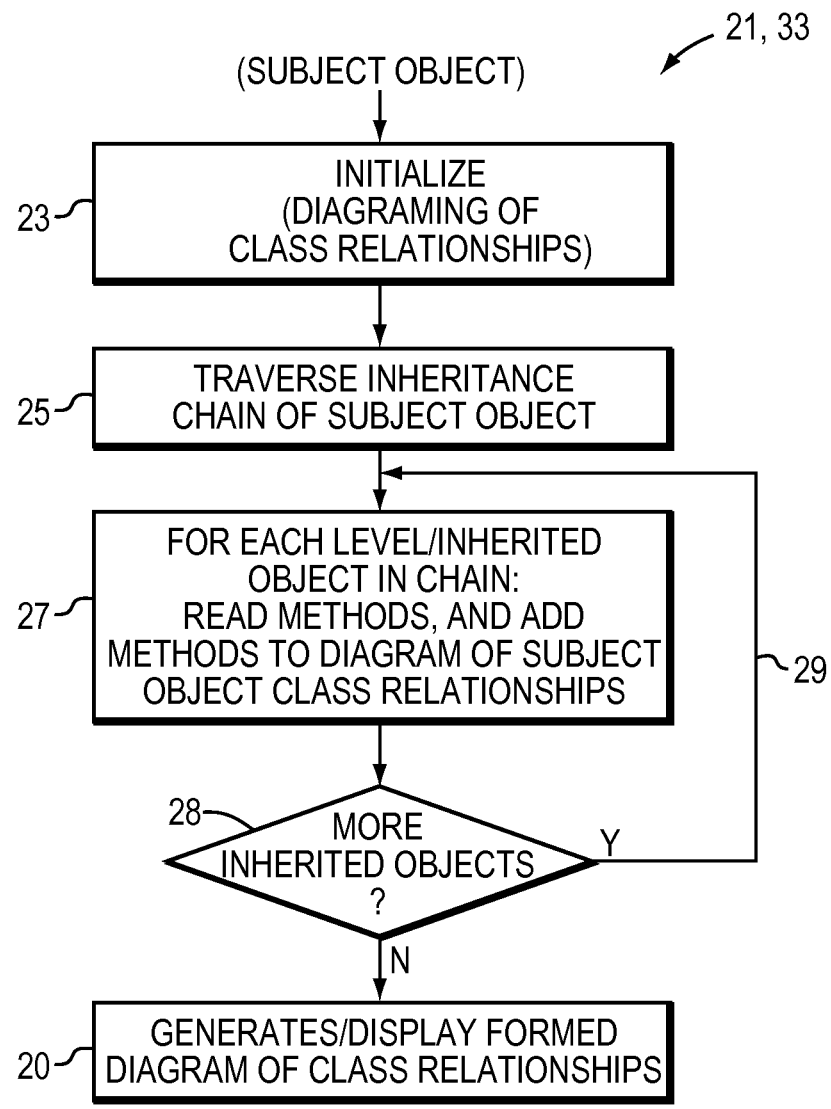
FIG. 2 is a flow diagram of the invention process or diagramming member for drawing (generating) a class relationship diagram of an object from a dynamic programming/scripting language (e.g. of a JavaScript Object).

Illustrated in FIG. 2 is a preferred process (diagramming member) 33 of generating the class relationship diagrams of the present invention. The process begins in response to user selection of a subject object and request/command for diagramming class relationships of the subject object. In step 23, the diagramming member 33 initializes the diagramming process including initializing appropriate data structure and memory file(s) for supporting a diagram of class relationships for the subject object.

Next in step 25, the inheritance chain of the subject object is traversed. In particular, the Prototype chain of the subject JavaScript object is traversed. For each level of the prototype chain/inherited object in the chain, step 27 reads the methods and properties of that inherited object and adds those methods/properties to the diagram of the subject object class relationships. That is, step 27 stores respective indications and read data in the diagramming data structure/memory files. Similarly, step 27 identifies classes that are referenced in the first classes member variable, any class from which the first class inherits and relationships between the referenced classes and other classes. The loop of steps 27, 28 and 29 recurse for the different levels of inherited objects in the inheritance chain of the subject object.

After each level and inherited object in the inheritance chain has been read by step 27, step 20 forms the diagram of class relationships of the subject object. In particular, the stored data in the diagramming data structure/memory files are used to draw, in graph notation or UML notation or other modeling language, a formal diagram of the class relationships. In this way, the formed diagram visually illustrates relationships between the subject object and objects it contains as well as between the subject object and objects it inherits from. On output, diagramming member 33 generates and displays the formed diagram of class relationships for a subject object.

Exemplification

Figure 5A:
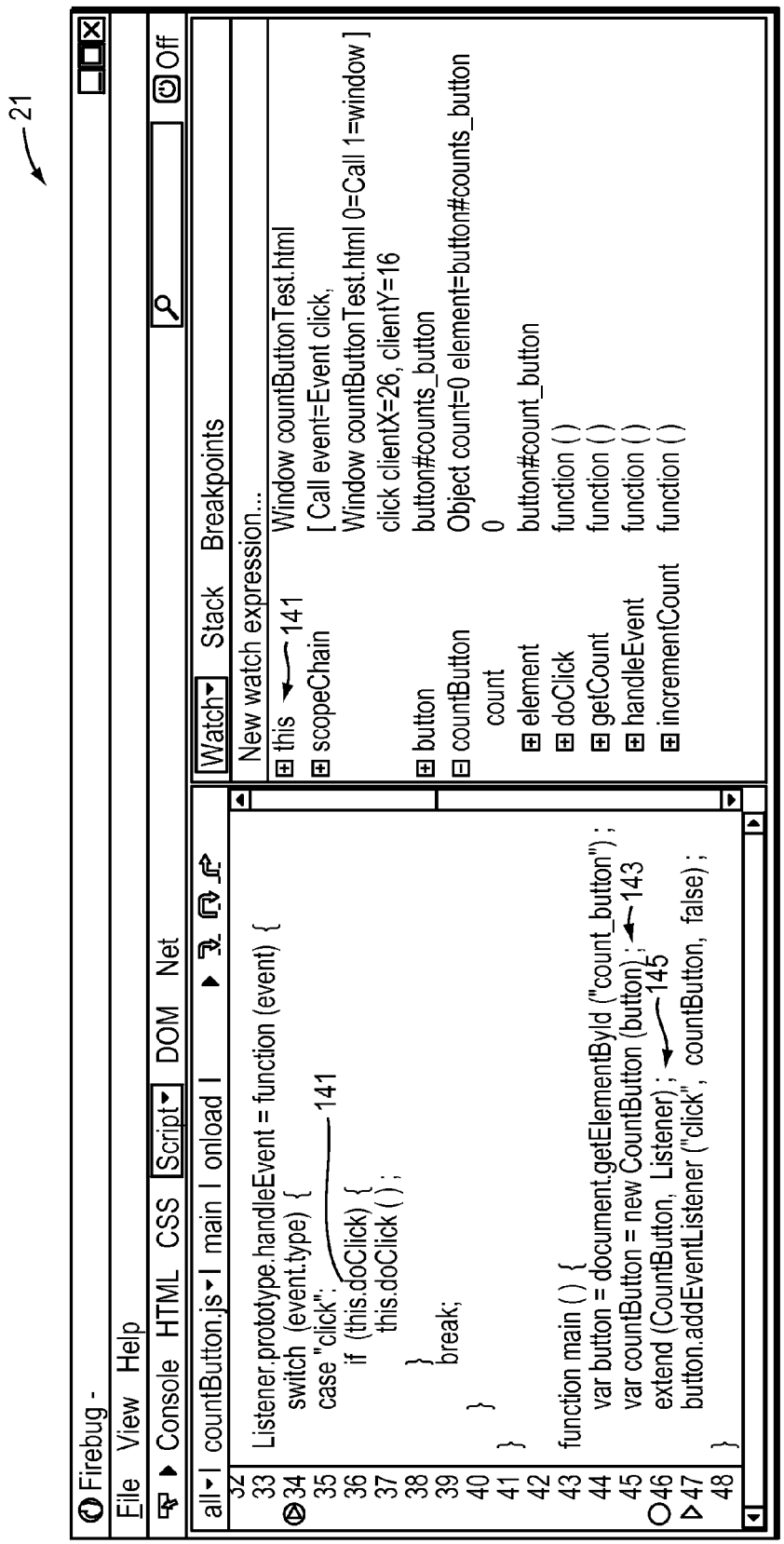
FIGS. 5a-5c are schematic views of an example debugging session in one embodiment of the present invention, resulting in a UML relationship diagram of FIG. 5c.
Figure 5B:
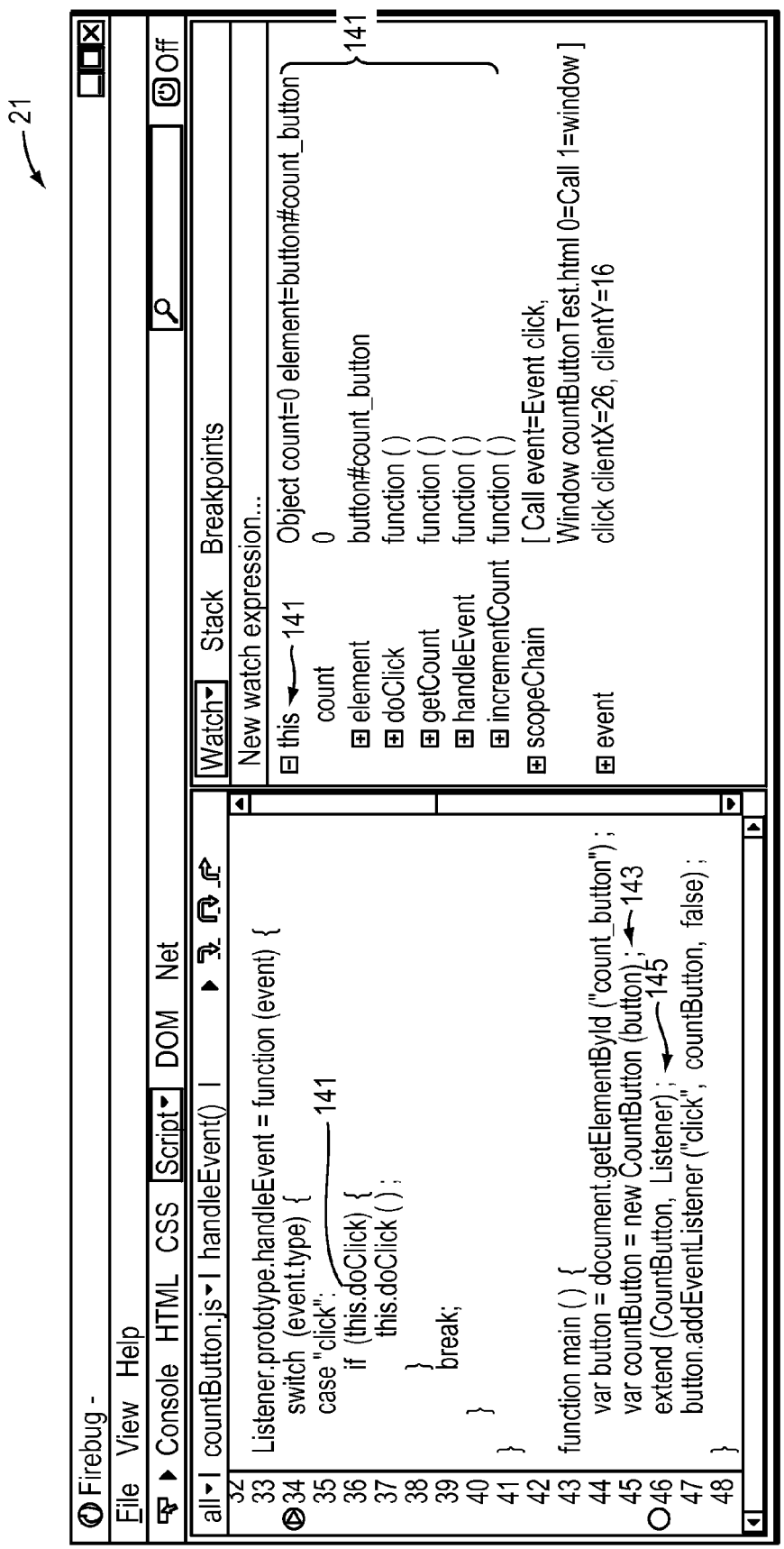
Figure 5C:
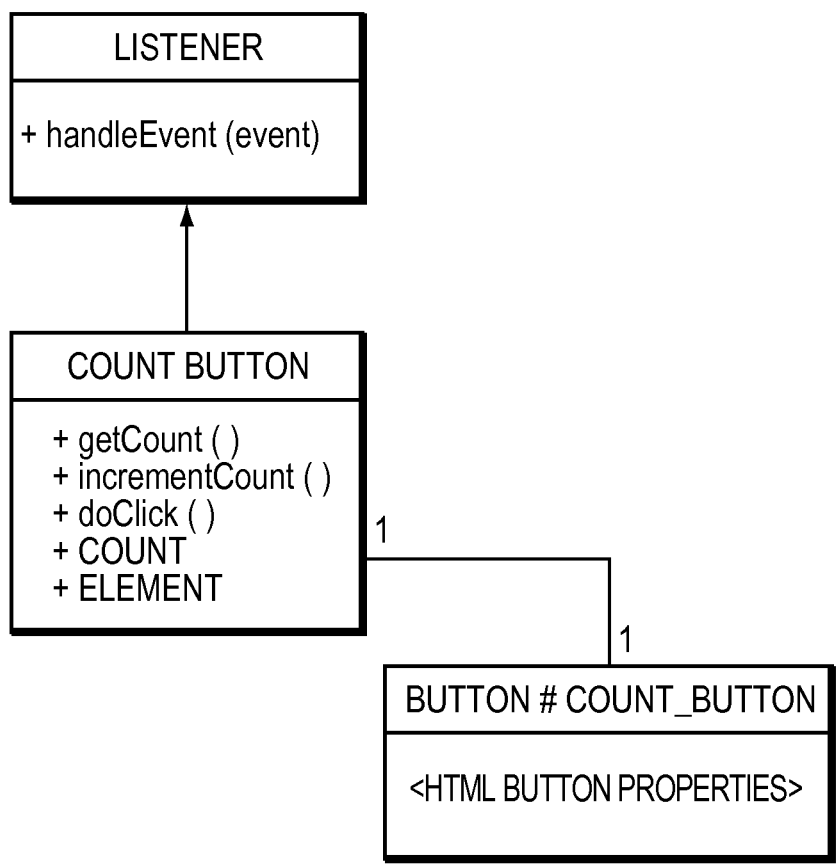

With reference to FIGS. 5a-5c, an example debugging session in one embodiment of the present invention is provided by way of illustration and not limitation.

The example HTML code of FIG. 5a (left hand side) displays an HTML button in a web page. When the subject page loads, the included or otherwise associated JavaScript code wraps that button element and adds functionality to it. With the added functionality, when an end-user clicks on the button, the subject page displays the number of times the button has been clicked. It can be difficult (sometimes) to tell exactly what 'this' (the supporting JavaScript object) 141 is when looking at the JavaScript code (left hand side of FIGS. 5a, 5b). If one looks there at the CountButton code 143, one sees it does not define a 'handleEvent' method and yet we are going to add the CountButton object as an event handler for mouse clicks to the button element on the subject page. The 'extends' function at 145 did just that although no Listener object that defines the handleEvent method was ever formally created.

After end-user clicking on the subject page displayed button, the handleEvent method gets called, but the debugger 21 in FIG. 5b (right hand side) is showing that the JavaScript code is stepping through the Listener object (that does not formally exist). If one looks at the properties of object 'this' (at 141 in FIG. 5b), one might be able to tell that object 'this' is not an instance of a 'Listener' but rather an instance of 'CountButton'. But notice also that Listener's handleEvent method is going to call 'doClick' and likewise it does not define a 'doClick' method.

If one right clicks on object 'this' at 141 in FIGS. 5a, 5b and chooses 'class diagram,' debugger 21 generates and displays the corresponding UML or some similar class relationship diagram 47 of FIG. 5c. Example diagram 47 shows object 'this' 141 is a 'CountButton' and CountButton inherits the handleEvent method from the Listener prototype and also contains a reference to an HTML button.

Figure 3:
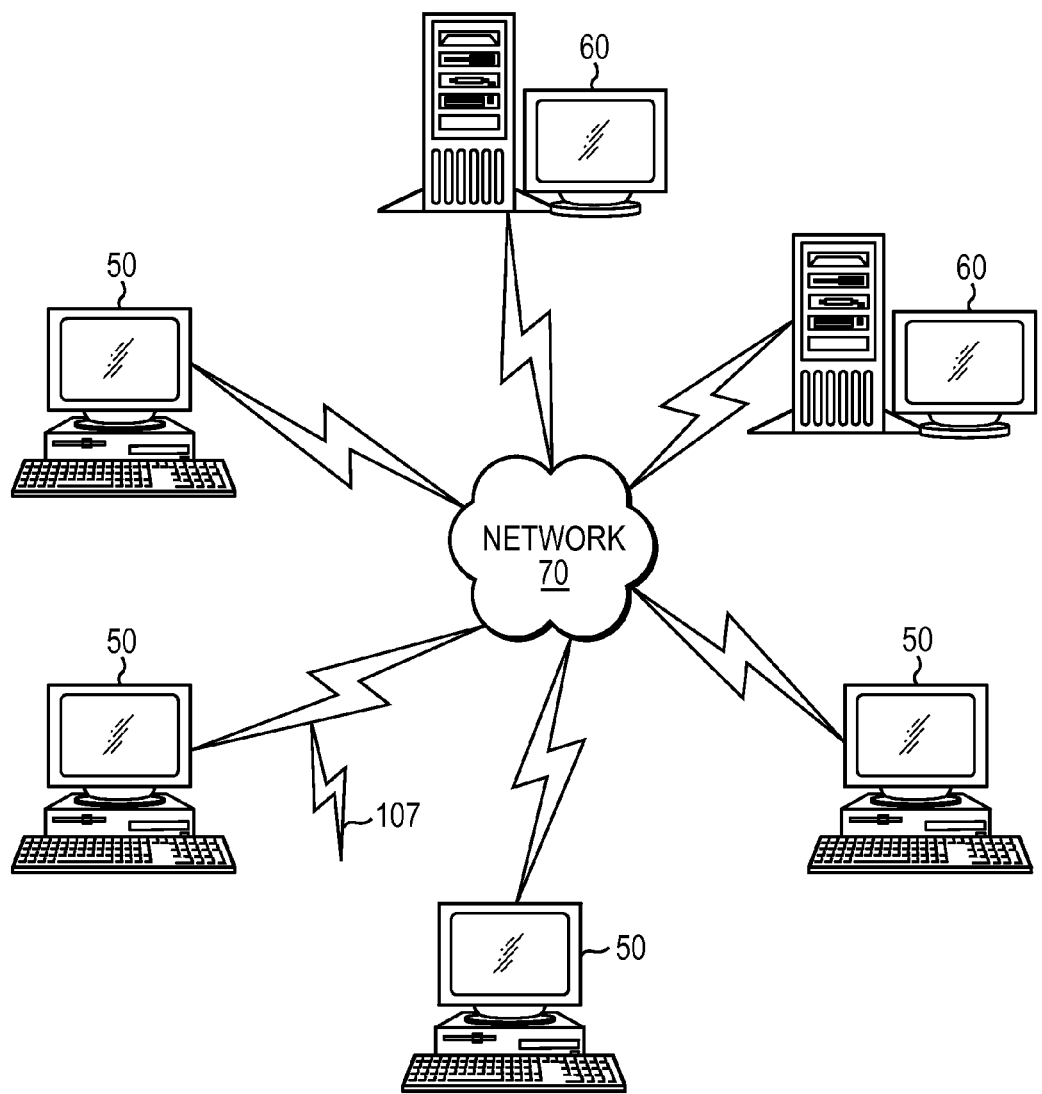
FIG. 3 is a schematic view of a computer network in which embodiments of the present invention operate.

With reference now to FIG. 3 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 4:
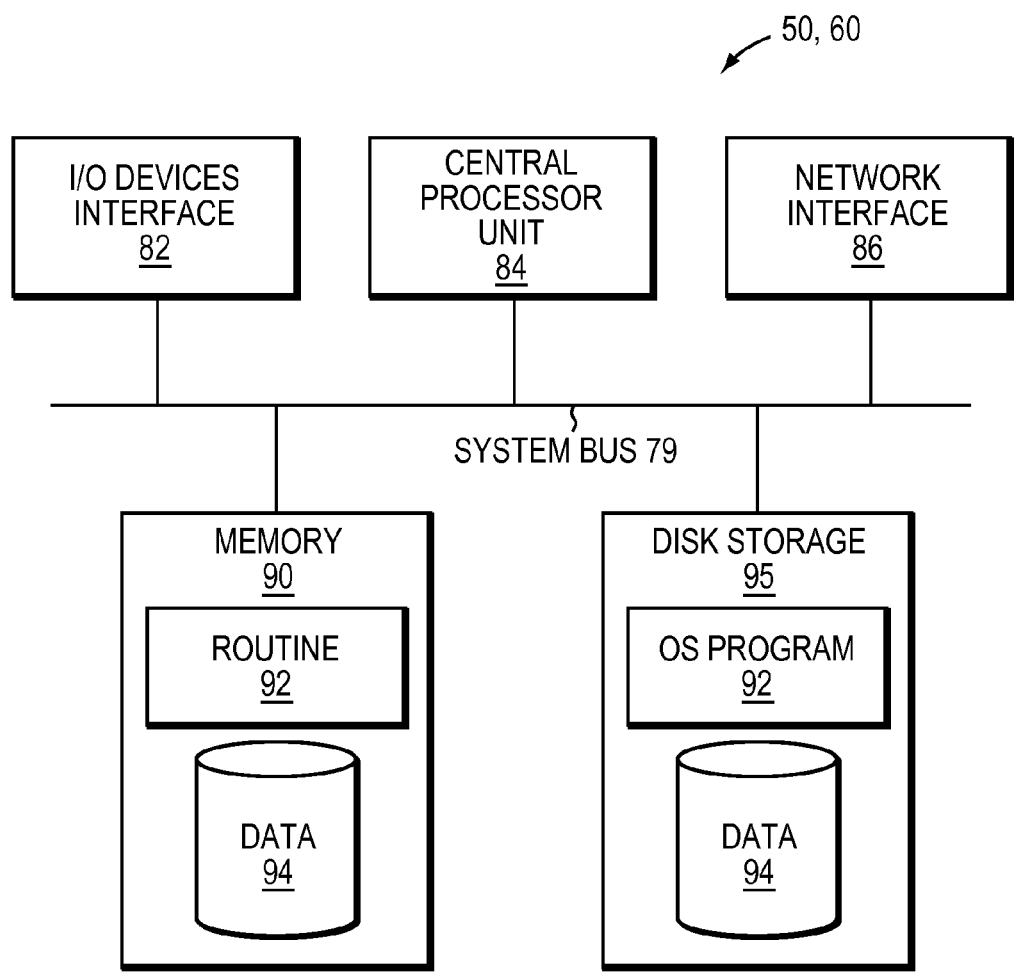
FIG. 4 is a block diagram of a computer node in the network of FIG. 3.

FIG. 4 is a diagram of the internal structure of a computer (e.g., client processor/device 50 or server computers 60) in the computer system of FIG. 3. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 3). Memory 90 provides volatile storage for computer software instructions 92 and data 94 used to implement an embodiment of the present invention (e.g., diagramming member 33, debugger 21, and supporting code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method of debugging a dynamic computer language, comprising:
   forming a diagram illustrating class relationships between objects at runtime by generating a class relationship diagram of a subject object in a dynamic computer language, resulting in effectively diagramming class relationships of the subject object, the subject object in the dynamic computer language having an anonymous nature limiting visualizing of objects' runtime relationships, wherein the dynamic computer language makes no distinction between function definition and method definition except for during function calling, and wherein the subject object in the dynamic computer language is integrated and loosely typed such that the subject object is able to be hosted in various environments, wherein the generated class relationship diagram shows class relationships between the subject object and objects that the subject object contains or inherits from, said class relationships being distinct from parent-child dependency;
   wherein the step of forming a diagram includes:
   traversing an inheritance chain of the subject object;
   for each level in the inheritance chain, reading methods of inherited objects;
   adding the read methods to the subject object as dynamically generated; and
   on output to a user, displaying the generated class relationship diagram as the formed diagram.

2. A method as claimed in claim 1 wherein the step of forming a diagram includes drawing the diagram using modeling language like notation.

3. A method as claimed in claim 1 wherein the step of forming a diagram includes drawing the diagram using graph notation.

4. A method as claimed in claim 1 wherein the diagramming of class relationships is in response to user request or command.

5. A method as claimed in claim 1 wherein the dynamic computer language is Java Script.

6. A method as claimed in claim 5 wherein the steps of forming a diagram and displaying the formed diagram are implemented by a JavaScript debugger.

7. A method as claimed in claim 1 wherein the formed diagram visually shows relationships between the subject object and objects it contains.

8. A method as claimed in claim 7 wherein the formed diagram visually shows relationships between the subject object and objects it inherits from.

9. A computer debugging system comprising:
   a diagramming member configured to form a diagram illustrating class relationships between objects at runtime by generating a class relationship diagram of a subject object from a dynamic computer language, the diagramming member effectively diagramming class relationships of the subject objects, the subject object in the dynamic computer language having an anonymous nature limiting visualization of objects' runtime relationships, wherein the dynamic computer language makes no distinction between function definition and method definition except for during function calling, and wherein the subject object in the dynamic computer language is integrated and loosely typed such that the subject object is able to be hosted in various environments, wherein the generated class relationship diagram shows class relationships between the subject object and objects that the subject object contains or inherits from, said class relationships being distinct from parent-child dependency;

wherein the diagramming member forms the diagram by:

traversing an inheritance chain of the subject object;

for each level in the inheritance chain, reading methods of inherited objects;

adding the read methods to the subject object as dynamically generated; and a display unit displaying on output to a user the generated class relationship diagram as the formed diagram.

10. A computer system as claimed in claim 9 wherein the diagramming member forms the diagram by drawing the diagram using modeling language notation.

11. A computer system as claimed in claim 9 wherein the diagramming member forms the diagram by drawing the diagram using graph notation.

12. A computer system as claimed in claim 9 wherein the diagramming member effectively diagramming class relationships of the subject object is in response to user request or command.

13. A computer system as claimed in claim 9 wherein the dynamic computer language is Java Script.

14. A computer system as claimed in claim 13 wherein the diagramming member is implemented by a Java Script debugger.

15. A computer system as claimed in claim 9 wherein the formed diagram visually shows relationships between the subject object and objects it contains.

16. A computer system as claimed in claim 15 wherein the formed diagram visually shows relationships between the subject object and objects it inherits from.

17. A non-transitory computer program product for debugging in a dynamic programming language, the computer program product comprising:

a computer readable storage medium having computer readable program code embodied therewith, the computer readable program code comprising:

computer readable program code configured to responsively diagram class relationships of a subject object implemented in a dynamic language, resulting in a generated class relationship diagram of the subject object, the generated class relationship diagram illustrating class relationships between objects at runtime, the subject object implemented in the dynamic language having an anonymous nature limiting visualization of runtime relationships between objects, wherein the dynamic computer language makes no distinction between function definition and method definition except for during function calling, and wherein the subject object in the dynamic computer language is integrated and loosely typed such that the subject object is able to be hosted in various environments, wherein the generated class relationship diagram shows class relationships between the subject object and objects that the subject object contains or inherits from, said class relationships being distinct from parent-child dependency;

the computer-readable program code including:

traversing an inheritance chain of the subject object;

for each level in the inheritance chain, reading methods of inherited objects;

adding the read methods to the subject object as dynamically generated; and computer readable program code configured to display as output to a user the generated class relationship diagram of the subject object.

18. The non-transitory computer program product as claimed in claim 17 wherein the dynamic language is JavaScript and the computer program product is included in a JavaScript debugger.

* * * * *